US009015577B2

(12) United States Patent
Jones et al.

(10) Patent No.: US 9,015,577 B2
(45) Date of Patent: Apr. 21, 2015

(54) CONTENT FLOW THROUGH CONTAINERS

(75) Inventors: Christopher Lyman Jones, Seattle, WA (US); Alex Mogilevsky, Bellevue, WA (US); Eugene Veselov, Sammamish, WA (US); Sebastian Poulose, Redmond, WA (US); Paul Stephen Gildea, Seattle, WA (US); Markus Mielke, Redmond, WA (US); Koti Kiran Chegondi, Bellevue, WA (US); Nicholas Randall Waggoner, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 13/102,239

(22) Filed: May 6, 2011

(65) Prior Publication Data

US 2012/0284607 A1     Nov. 8, 2012

(51) Int. Cl.
*G06F 17/00*     (2006.01)
*G06F 17/21*     (2006.01)

(52) U.S. Cl.
CPC .................................... *G06F 17/212* (2013.01)

(58) Field of Classification Search
CPC . G06F 17/211; G06F 17/212; G06F 17/2229; G06F 17/3089; G06F 17/30908
USPC ......... 715/200, 201, 203, 204, 234, 236, 240, 715/273
See application file for complete search history.

(56) References Cited

U.S. PATENT DOCUMENTS

| | | | |
|---|---|---|---|
| 5,860,073 | A | 1/1999 | Ferrel et al. |
| 7,051,276 | B1 * | 5/2006 | Mogilevsky et al. ......... 715/209 |
| 7,647,553 | B2 | 1/2010 | Mogilevsky et al. |
| 7,958,516 | B2 * | 6/2011 | Buerge et al. ................. 719/318 |
| 8,185,819 | B2 * | 5/2012 | Sah et al. ....................... 715/243 |
| 8,185,830 | B2 * | 5/2012 | Saha et al. ..................... 715/762 |
| 2006/0174186 | A1 | 8/2006 | Caro et al. |
| 2007/0136201 | A1 * | 6/2007 | Sah et al. ......................... 705/51 |
| 2007/0204010 | A1 * | 8/2007 | Sah et al. ....................... 709/219 |

(Continued)

OTHER PUBLICATIONS

"TLF—Flowing text through multiple containers and line breaks", Retrieved at <<http://stackoverflow.com/questions/4235514/tlf-flowing-text-through-multiple-containers-and-line-breaks>>, 2010, pp. 3.

(Continued)

*Primary Examiner* — Stephen Hong
*Assistant Examiner* — Gregory J Vaughn
(74) *Attorney, Agent, or Firm* — Jim Banowsky; Kate Drakos; Micky Minhas

(57) ABSTRACT

Content can be flowed through one or more containers that can be laid out analogously to printed material. Content is flowed into the first specified container until that container is "full" of content. Subsequent content is then flowed through subsequent containers, each of which is individually identified, and whose ordering is specified independently of their position and visual presentation. Multiple independent sources of content can be flowed through multiple independent collections of containers. Each container can format the content presented within it independently from other containers, and each container can comprise script, or other programmatic constructs, which can operate on, and modify, the content flowed into such a container. To provide for the rich layouts, content containers can be nested inside one another such that multiple layers, or levels, of the layout can be edited independently of one another.

20 Claims, 5 Drawing Sheets

(56) References Cited

U.S. PATENT DOCUMENTS

| | | | |
|---|---|---|---|
| 2008/0033956 A1* | 2/2008 | Saha et al. | 707/9 |
| 2008/0263566 A1* | 10/2008 | Buerge et al. | 719/317 |
| 2009/0037806 A1* | 2/2009 | Yang et al. | 715/234 |
| 2011/0196928 A1* | 8/2011 | Pryhuber | 709/204 |
| 2011/0219294 A1* | 9/2011 | Leshner et al. | 715/234 |

OTHER PUBLICATIONS

"Ayone Blog", Retrieved at <<http://ayonesoftware.com/blog/2009/08/linked-containers-in-flex-4-using-text-layout-framework/>>, Aug. 18, 2009, pp. 4.

Mielke, Markus., "HasLayout" Overview, Retrieved at <<http://msdn.microsoft.com/en-us/library/bb250481%28v=vs.85%29.aspx, Aug. 31, 2005, pp. 5.

"Styling and Layout Sub-group Page", Retrieved at <<http://code.google.com/p/epub-revision/wiki/StylingAndLayout>>, 2010, pp. 9.

Lie, Hakon Wium, "CSS3 module: Generated Content for Paged Media", Retrieved at <<http://www.w3.org/TR/2007/WD-css3-gcpm-20070504/#named1>>, May 2007, pp. 34.

Chiculita, et al., "CSS Regions Specification", Retrieved at <<http://lists.w3.org/Archives/Public/www-archive/2011Mar/att-0011/CSS_Regions.pdf, Mar. 8, 2011, pp. 16.

\* cited by examiner

CONTENT FLOW THROUGH CONTAINERS

BACKGROUND

With the increasing popularity of tablet, or slate, computing devices, more content is being presented in a layout and a format that is analogous to that typically found in printed media, such as books, pamphlets, magazines and newspapers. For example, newspapers typically present printed content in a column format where a single article is distributed among multiple columns, including possibly across multiple pages. As another example, magazines typically present printed content in the same column format, but often intersperse a greater amount of graphics and other non-textual elements. Furthermore, because of the printed nature of such media, each page acts as a well defined conceptual entity, and users are well accustomed to flipping pages to access further printed content.

With the ubiquity of the Internet and the World Wide Web, however, a large amount of content is available in a fundamentally different format. More specifically, webpages typically present content in a "limitless scroll" paradigm where content is presented continuously and without page breaks as the user scrolls down the webpage. The concept of individual printed pages was superseded, on the World Wide Web, by the concept of individual webpages which, again, quite unlike a printed page, can each represent a limitless scroll.

The flexibility of the HyperText Markup Language (HTML), which defines most webpages on the World Wide Web, does enable webpage authors to individually, and manually, set up webpages that mimic printed media. However, such a task can be time-consuming and inefficient. For example, the webpage author must carefully select the amount of text, or other content, that is to be displayed on each webpage that is designed to mimic a printed page. Additionally, the webpage author must repeat this process for each individual webpage, and each time the content changes.

SUMMARY

In one embodiment, content, such as text, graphics, or other hypermedia or multimedia content, can be flowed, such as by a browser, through one or more containers in a specified order, thereby enabling the containers to be positioned and presented in a visually desirable manner, such as in a layout analogous to that found in printed material. As content fills one container, the remaining content can be directed to the next subsequent container, irrespective of the positioning and placement of that container, and irrespective of the formatting, or other size-centric attributes of the content. The formatting, positioning and placement of containers can be performed independently of any content that will be flowed through them.

In another embodiment, multiple different, and independent, sources of content can be flowed through multiple different, and independent, collections of containers. In such an embodiment, adjacent containers may comprise content from different sources, and the content sources can be specified and modified independently of the collections of containers.

In a further embodiment, content that is flowed through containers can be formatted in accordance with formatting specified by each individual container, thereby enabling a single collection of content to be formatted differently as it is flowed through different containers. Additionally, containers can comprise script, or other programmatic constructs and capabilities, which can act upon, and modify, content that is flowed into those containers.

In a still further embodiment, containers can be dynamically added, such as by a browser, until all of the content that is to be flowed through containers has, in fact, been flowed through containers. Optionally, a series of layouts can be provided and the browser can select, either randomly or as instructed, from the layouts so as to dynamically added additional containers to accommodate content that has not yet been flowed through a container. To signal, such as to a browser, that additional content remains to be flowed through a container, the last displayed container can comprise a flag that can be set if additional content remains that was not flowed into that container, thereby prompting the browser to dynamically add additional containers.

In a still further embodiment, the containers into which content can be flowed can themselves comprise nested containers into which content can be flowed. Multiple levels of nested containers can be utilized to provide for more complex layouts, each level, or layer, of which can be independently changed or modified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
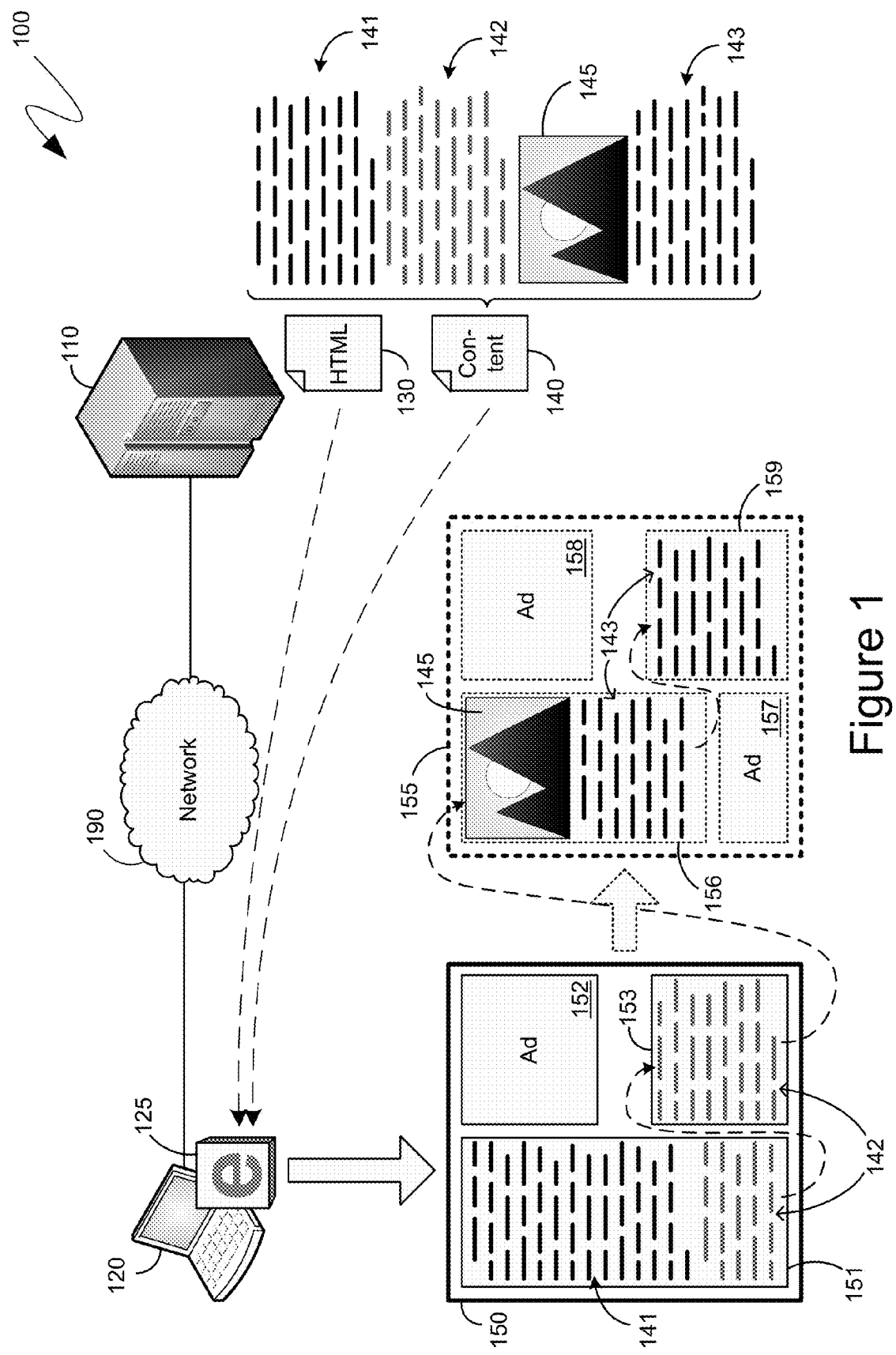
FIG. 1 is a block diagram of an exemplary flowing of content through multiple containers.

The following description relates to the automated flowing of content through one or more containers that can be positioned and presented in a visually desirable manner, such as in the layout analogous to that found in printed material. Content is flowed into the first specified container until that container is "full" of content. Subsequent content can then be flowed, in a like manner, through subsequent containers, each of which can be individually identified, and whose ordering can be specified independently of their position and visual presentation. If content remains that has not been flowed through a container, additional containers can be dynamically added, such as by a browser application program, to provide for display of all of the content indicated to be flowed through containers. Multiple independent sources of content can be flowed through multiple independent collections of containers such that containers that are visually presented as adjacent to one another may comprise content from different, independent sources. Each container can format the content presented within it in a manner independent from other containers, and each container can comprise script, or other programmatic constructs, that can operate on, and modify, the content flowed into such a container. To provide for the rich layouts, content containers can be nested inside one another such that multiple layers, or levels, of the layout can be edited independently of the other layers, or levels.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML) and the Cascading Style Sheets (CSS) stylesheet language. Such references, however, are strictly exemplary and are not intended to limit the mechanisms described to the specific examples provided. Indeed, the techniques described are applicable to any environment and language within which one or more containers can be established and linked so as to define the flow of an independent collection of content through them.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a computing device 120 that can access content, over the network 190, such as with a network browser application program 125 that can execute, in a known manner, on the computing device 120. A server computing device 110 is shown as being communicationally coupled to the network 190 such that it can provide content to the network browser application program 125 executing on the computing device 120 that is, likewise, communicationally coupled to the network 190. In one embodiment, content presented by the server computing device 110 can be formatted in accordance with one or more containers of content whose positioning can be defined such that they are presented, on the computing device 120, by the network browser 125, in an established layout. The descriptions below make reference to a "browser", such as the network browser 125, performing actions directed to the formatting and presentation of content. As utilized herein, the term "browser" means not only the computer-executable instructions that provide browsing functionality, but also computer-executable instructions, and computer-interpretable instructions, such as scripts, that can be obtained and executed, or interpreted, by the browser. Thus, for example, the formatting of content can be defined by a document that can further reference or incorporate scripts or other computer-executable and computer-interpretable instructions that can perform or implement the defined formatting. In such an example, the performance of actions by scripts or, more accurately, a script interpretation engine, is intended to be covered by the below references to a "browser" performing one or more actions. Put differently, and as will be recognized by those skilled in the art, the functions described below as being performed by the browser can be equally implemented in the computer-executable instructions of the browser, or in computer-executable or computer-interpretable instructions executed or interpreted by the browser or sub-components thereof, or in some combination thereof, without departing from the mechanisms described.

In the specific example shown in the system 100 of FIG. 1, the content can be represented by a data source 140, which can comprise, or reference, textual content, such as in the form of paragraphs 141, 142 and 143, graphical content 145, and other types of hypermedia and multimedia content that are not explicitly shown in FIG. 1, including, for example, HTML content itself. Additionally, in the specific example shown in the system 100 of FIG. 1, the formatting of the content 140 can be defined by an HTML document 130 that can establish the layout and visual presentation of one or more containers into which the content 140 can be flowed, such as by the network browser 125, when it is displayed on a computing device, such as the computing device 120. Again, as indicated previously, reference to HTML is strictly exemplary and is only intended to provide context for the descriptions below. The mechanisms described below, as will be recognized by those skilled in the art, can be equally implemented by other mechanisms that define the positioning and layout of content that can be accessed over a network, and do not require any specific aspect or attribute of HTML. For purposes of illustration, both the content 140 and the HTML document 130 are shown as being provided by the server computing device 110. However, as will be recognized by those skilled in the art, the content 140 can be retrieved, such as by the computing device 120, from a computing device that is remote from the computing device hosting the HTML document 130.

As is illustrated by the system 100 of FIG. 1, and in a manner well known to those skilled in the art, a browser application program, such as the browser 125, can retrieve both the HTML document 130 and the content 140, whether from one computing device, or multiple computing devices communicationally coupled to the network 190, and can format the content 140 in accordance with the containers defined and specified by the HTML data source 130. The display 150 illustrates one exemplary display that can be generated, by the network browser 125, on the computing device 120, based on the containers defined and specified by the HTML data source 130 in the content 140 that the network browser 125 flows through those containers. For example, as illustrated in the exemplary display 150, the content 140 can be flowed through containers 151 and 153 that can define specific areas of the display 150. As will be recognized by those skilled in the art, the HTML document 130 can define and arrange the containers 151 and 153 such that their heights and widths are specified, as are the locations, on the display 150, where such containers are to be positioned.

In one embodiment, the HTML document 130 can comprise an explicitly stated ordering of containers in accordance with which the content 140 is to be flowed through those containers. Additionally, the HTML document 130 can comprise explicitly stated definitions of the containers that can identify the containers, identify the contents to be flowed through those containers, and identify the order of each container. For example, the HTML document 130 can specify that a container, such as the container 151, is to have a defined height and width, such as is shown in the exemplary display 150, and is to be positioned such that it aligns with the left hand side of the exemplary display 150. Additionally, the HTML document 130 can specify that another container, such as the container 153, is, again, to have a defined height and width and is to be positioned such that it aligns with the lower middle of the exemplary display 150.

The HTML document 130 can also define other content to be displayed within the exemplary display 150. For example, as illustrated by the exemplary display 150, the HTML document 130 can incorporate one or more advertisements, such as the advertisement 152, or other textual, graphical, or other hypermedia and multimedia content around and proximate to the above referenced content containers. In one embodiment, because the content to be flowed through the containers, such as the content 142, and the ordering in which that content is flowed through those containers can both be explicitly defined by the HTML document 130, the positioning of other textual, graphical, or like elements around and proximate to those containers can not affect or disrupt the flow and presentation of content through those containers.

Thus, as shown in the exemplary display 150, such as can be generated by a network browser 125 in response to retrieving the HTML document 130 and the content 140, the content 140 can be flowed through the containers 151 and 153. For example, the first paragraph 141 of the content 140 is shown as being flowed into the container 151. Subsequently, the second paragraph 142 of the content 140 is shown as being flowed into the container 151 until the container 151 is full. The remainder of the second paragraph 142 of the content 140 is shown as being flowed into the container 153, commencing, at the beginning of the container 153, where the content left off at the end of the container 151.

In one embodiment, if additional content remains that has not been flowed into containers, the network browser 125 can automatically generate additional containers into which to flow the remaining content. For example, as shown in the system 100 of FIG. 1, the containers 151 and 152 of the display 150 may comprise only sufficient room to enable the display of paragraphs 141 and 142 of the content 140. In such an example, the graphical image 145 and the paragraph 143, which are both also part of the content 140 can not have been flowed into any container and, as such, can remain undisplayed. In such a case, in the presently described embodiment, the network browser 125 can, upon detecting that addition ones of the content 140 remain undisplayed, dynamically generate additional containers, such as the containers 156 and 159 shown in FIG. 1. To facilitate the detection, such as by the network browser 125, that additional content remains, containers, such as the containers 151 and 153 can comprise a flag or other like data structure that can indicate when there exists additional content, from among the content that was to be flowed into such a container, that was not, in fact, flowed into the container due to the container already being full of content. If the last container in a series of containers into which specified content was to be flowed has such a flag set, then an appropriate application program, such as the network browser 125, can automatically and dynamically generate additional containers.

As indicated previously, one advantage to the flow of content through containers, such as in the manner described above, is that network-accessible content can be displayed in layouts akin to those found in printed material, such as magazines and brochures, while the layouts can remain independent of the content and the content can just be flowed into them. In such an embodiment, when generating additional containers, such as the dynamically generated containers 156 and 158, the network browser 125 can generate such containers within the context of a dynamically generated layout. For example, the layout exemplified by the display 150 can represent a default layout, with one full column of content, one half column of content and one half column of advertisement. In such a case, another display, analogous to the display 150, could be dynamically generated by the network browser 125 and two containers could be dynamically generated as part of that dynamically generated layout so as to enable the additional content, from among the content 140, that was not flowed into the containers 151 and 153, to be flowed into the dynamically generated containers. Alternatively, the network browser 125 can be instructed to select from one or more alternative layouts, either randomly or by specifying a specific layout, and the dynamically created containers can be displayed in accordance with at least one of those alternative layouts. For example, the dynamically created display 155 illustrates an alternative layout comprising dynamically created containers 156 and 159, as well as dynamically created advertisements 157 and 158.

Once additional containers are dynamically created, such as the dynamically created containers 156 and 159, the content, from among the content 140, that was not flowed into the containers 151 and 153, can be flowed into the dynamically created containers 156 and 159. Thus, as shown in the system 100 of FIG. 1, the next content element after the paragraph 142, which was flowed into the containers 151 and 153, can be the graphical image 145 that can be flowed into the dynamically created container 156 in the manner illustrated. Additional content, such as the paragraph 143 can then be flowed into the dynamically created container 156 until such a container is full, and can the remainder of the paragraph 143 can then be flowed into the container 159, as also illustrated. In such a manner, layouts evoking printed pages of content can be created without having to recode such layouts each time the quantity of content to be flowed through such layouts changes.

Figure 2:
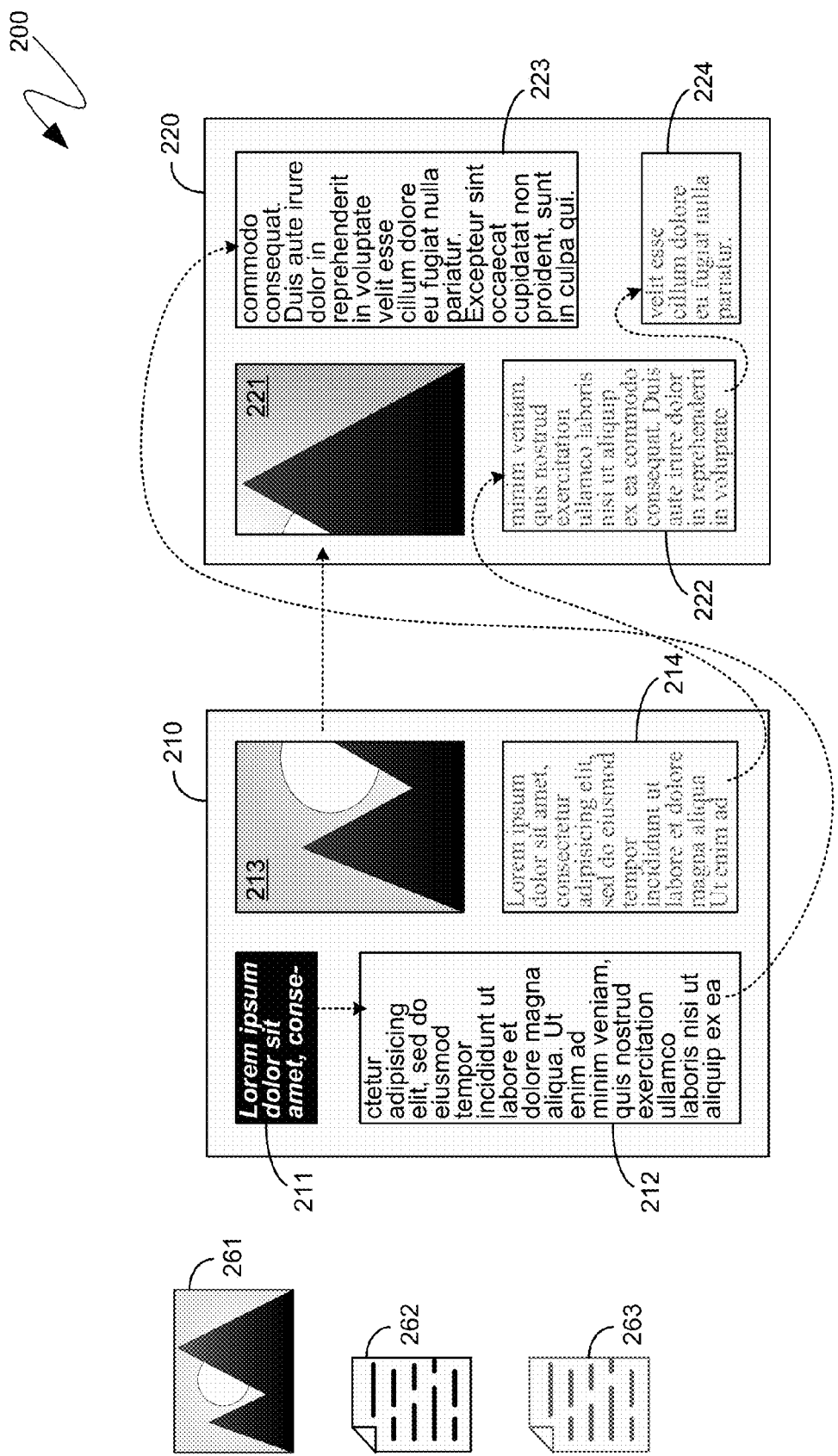
FIG. 2 is a block diagram of an exemplary relationship between content and containers.

Turning to FIG. 2, the system 200 shown therein illustrates exemplary displays of content generated utilizing the above-described mechanisms, and corresponding details. More specifically, the system 200 of FIG. 2 illustrates displays 210 and 220, respectively, that can flow multiple independent sources of content, such as the content of 261, 262 and 263, through multiple independent sets of containers positioned throughout the displays 210 and 220.

In one embodiment, HTML instructions associated with the displays 210 and 220 can comprise definitions of containers through which content can be flowed, though, again, as indicated previously, the mechanisms described can be equally implemented through any other markup language or similar construct. Additionally, for purposes of illustration, the below descriptions reference specific HTML elements with which to define and create the content containers. However, other existing HTML elements, or other markup language constructs, can likewise be utilized. For example, in one preferred embodiment, the HTML "IFRAME" tag is utilized because, as will be recognized by those skilled in the art, an IFRAME can act as a "window" on the content and, as such, can divide content between two or more containers irrespective of the natural divisions within the content. For example, an IFRAME can divide a single image among two or more containers even though, traditionally, an image is treated as a single, undivided, unitary entity. Additionally, an IFRAME can enable scripts, or other programmatic constructs that can be invoked by, for example, the page 230, to act upon the content presented within the IFRAME, even though such content may be sourced from a different document, or a different location.

In one embodiment, reference can be made to additional information, such as an flow order statement that can be made in a separate file, such as a Cascading Style Sheet (CSS) file that can define aspects or attributes of elements. For example, a CSS file can define a "flowClass" as follows: .flowClass {-ms-flow-from: flow 1;}. Containers can then be specified in HTML as follows: <iframe src="src.html" style="-ms-flow-into: flow1">, with then subsequent elements in the form of: <div class="flowClass" id="Alpha"></div>, <div class="flowClass" id="Bravo"></div>, <div class="flowClass" id="Charlie"></div>and so on establishing individual containers through which content will be flowed in the order in which those containers are specified by the elements.

The elements can comprise, either directly or indirectly, information identifying the content that is to be flowed through the container established by each respective element, as well as the order of that particular container within a set of containers through which identified content is to be flowed. For example, elements can comprise an identification of a flow property, such as "flow1" in the above example, by which the containers specified by those elements can be grouped. In one embodiment, containers established by elements having a same flow property can define a grouping of containers through which identified content will be flowed. Thus, for example, elements having the "flow1" flow property can define containers that can have the same content flowed through them.

Additionally, elements can comprise an identification of a particular order that can define where the particular container established by those elements falls in the serial order in which content is flowed from one container to the next. As indicated previously, in one embodiment, the order in which content is flowed through containers can simply be determined by the order in which the elements establishing those containers are enumerated, such as in an HTML document. Thus, in the above example, content can flowed into the container established by the element specifying an identifier of "Alpha" first, before any overflow content is flowed into subsequent containers, such as those established by elements specifying identifiers of "Bravo", "Charlie" and so on.

Additionally elements can, either directly or indirectly, comprise an identification of the content that is to be flowed through containers defined by those elements. In one embodiment, the identification of the content that is to be flowed through a set of containers can be identified by an element, such as the IFRAME in the above example. In such an embodiment, the elements establishing subsequent containers, such as the DIV elements in the above example, need not explicitly identify the content to be flowed through those subsequent containers, since such identification can be redundant.

Elements can also specify additional information about the visual presentation of the content within the containers established by those elements. For example, elements can each, individually, specify a height and width, or other dimensional aspects of the containers established by those elements. In one embodiment, the specification of such dimensional aspects can be in a manner typical utilized by HTML elements to specify dimensions of the visual components they establish. As will be recognized by those skilled in the art, elements can, likewise, specify the positioning of the containers established by those elements, such as with respect to other visual components, predefined page boundaries, a coordinate system, or any other like positioning information.

In one embodiment, in addition to specifying dimensional and positional attributes of the content containers that they establish, elements can likewise specify formatting attributes that can be applied to the content that is flowed through the containers that they establish. For example, the element that establishes the container 211, in the display 210, can specify that the text of the content that is flowed through the container be bolded, then italicized, and be displayed in a white color. That element can further specify that the background of the container that it establishes be black in color. Thus, as shown in the display 210, the container 211 that is established by such an element, can display that portion of the content 262 that is flowed into the container 211 in a bolded and italicized font, in a white color, and against a black background. The display of the content 262, in the container 211, can be in accordance with the formatting specified by the element that established the container 211, and can be different than any formatting that may have been applied to the content previously, or as part of the file 262.

Continuing with the example illustrated by the system 200 of FIG. 2, the container 212 can comprise at least a portion of the content remaining after an initial portion of the contents 262 was flowed into the container 211 that was established by the element 231. As can be seen from the illustrated example, the formatting applied to the text flowed into the container 212 can be different from the formatting applied to the text flowed through the container 211 despite the fact that the text flowed into the container 212 is a continuation of the text flowed into the container 211. In such a manner, containers can be utilized to establish formatting or other visual layout attributes independently of any content that is flowed into those containers. Once established, such as by being defined by the corresponding elements, the formatting can be applied independently of any content that is flowed into those containers, thereby enabling the content that is flowed into those containers to change without changing the formatting, or other visual display attributes, of the display 210.

For containers of textual content, such content can be flowed into the container in accordance with the direction in which such content is typically read. For example, in Western countries, content is typically read beginning in the upper left-hand corner and concluding in the bottom right-hand corner. Consequently, such textual content can be flowed into a container beginning at the top of the container and ending at the bottom of the container. However, for other types of content, such as, for example, for graphical content, such as the content 261, the content can be flowed into a container in other directions. For example, the graphical content 261 can be flowed into the container 213 in a left-to-right direction. In such an embodiment, the graphical content 261 can be flowed into the container 213 commencing at the left-hand side of the container 213 and continuing until either all of the content 261 has been flowed into the container 213, or until the right-hand side of the container 213 is reached. As can be seen from the particular example illustrated by the system 200 of FIG. 2, only a portion of the graphical content 261 can be fit into the container 213.

Because containers of content are independent of the content itself, in one embodiment, content can be flowed into a container until that container is full irrespective of the division imposed on the content. For example, the graphical content 261 can comprise a single unitary image. As will be known to those skilled in the art, a single unitary image is typically treated as an indivisible entity. Thus, images are typically not split across, for example, pages when a document is printed. However, when content is flowed into a container, in one embodiment, the content can be divided among two or more containers even if such content would otherwise have been treated as a single unitary and indivisible entity. More colloquially, the containers of content can be thought of as "windows" onto content, such that the "view" of such content through such a "window" can be limited by the boundaries of the "window" irrespective of the divisibility of the content itself. As will be recognized by those skilled in the art, the HTML IFRAME tag provides one mechanism for implementing such a "window" onto content.

As indicated previously, containers of content, such as those described in detail above, can enable rich graphical layouts that can be patterned after layouts typically found in printed material, such as magazines, newspapers, pamphlets, and other like printed material. Thus, in the exemplary system 200 shown in FIG. 2, the display 210 can emulate the display of, for example, a magazine page. In such a manner, even though the display 210 need not be bound by dimensional constraints inherent in physical, printed pages, it can comprise containers of content that can be arranged such that the display 210 emulates page dimensional constraints.

Turning to the display 220, the container 221 illustrates a continuation of the content that was commenced in the container 213, as shown in the display 210. As indicated previously, the graphical content 261 can initially be flowed into the container 213, and the remaining graphical content, flowed from a left-to-right basis, can be flowed into the container 221. More specifically, the graphical content 261 can be flowed into the container 213 commencing at the left-hand side of that container. Once the flow of the graphical content 261 into the container 213 reaches the right-hand side of that container, it can end and the location, in relation to the graphical content 261, at which it ended can be marked. A subsequently ordered container, such as the container 221, can then receive the flow of the graphical content 261 commencing, again, at the left-hand side of the container 221, at the location, in relation to the graphical content 261, at which the previous flow of that graphical content into a container ended. The resulting display, such as is shown by the exemplary system 200 of FIG. 2, can show a portion of the graphical content 261 in the container 213, and a subsequent portion, considering a left-to-right flow, of the graphical content 261 in the container 221.

In a similar manner, and as indicated previously, textual content, such as the content 232, can be flowed in accordance with the reading conventions appropriate for such textual content. For example, the textual content shown in the exemplary system 200 of FIG. 2 can be flowed in a top-to-bottom manner. Thus, for example, the textual content 262 can commence at the top of the container 211 and can be flowed into the container 211 until the bottom of the container is reached. The location, with respect to the content 262, at which point the flow of content into the container 211 stopped can be marked, and the flow of the content 262 into a subsequent container, such as the container 212, can commence at such a marked point. Thus, the container 212 can have flowed into it the content 262 starting from wherever the flow of content into the prior container, namely the container 211, left off.

The flow of content in the container 212 can, likewise, proceed in a top-to-bottom manner, commencing at the top of the container 212 and continuing until the bottom of the container 212 is reached. As before, the point at which the flow of content was stopped can be marked, and the flow of content into a subsequent container, such as the container 223, can commence from such a point. Again, the flow of content into the container 223 can commence at the point at which the flow of content into the container 212 was left off, and subsequent content can be flowed into the container 223 starting with the top of that container. In such a manner, the content 262 can be flowed across multiple displays, and the formatting and manner in which such content is flowed, such as is evidenced by the displays 210 and 220, respectively, can provide an appearance of a printed publication having multiple printed pages.

Additionally, content can be flowed through containers such that multiple independent sources of content can be independently flowed through independently established collections, or groupings, of containers such that those containers can be utilized to present content in a visual manner akin to that typically found in printed publications. For example, as illustrated by the exemplary system 200 of FIG. 2, the displays 210 and 220 show three different and independently referenceable sources of content, namely the content 261, 262 and 263, being flowed through containers within the displays 210 and 220 in a manner and style analogous to that which would be found in, for example, magazine pages. As can be seen from the displays 210 and 220, multiple independent sources of content, such as the content 261, 262 and 263, can be interleaved among containers on a single page and then carried through multiple pages. For example, as can be seen from the exemplary system 200 of FIG. 2, the content 261, which can be, for example, a picture, can be spread across the displays 210 and 220 such as a picture that might be spread across two pages of a magazine. Additionally, the content 262 and 263, which can be, for example, textual content such as to related magazine articles, can likewise be spread across two pages of a magazine such that a primary article, for example represented by the content 262, can be introduced at the upper left-hand corner of the display 210, while a secondary, or "sidebar" article, for example represented by the content 263, can be interleaved with the primary article.

More specifically, and as illustrated in FIG. 2, the textual content 262 can be flowed through the containers 211 and 212 in the display 210 and then through the container 223 in the display 220. Similarly, the textual content 263, which can be in a completely different file or container from the content 262, can be flowed through the container 214 in the display 210 and then through the containers 222 and 224 in the display 220. Likewise, as indicated, the image content 261 can be flowed through the containers 213 and 221. As indicated previously, in one embodiment, a series of containers, for having content flowed through them, can be established through the use of an HTML IFRAME element that can specify the content to be flowed through the containers, as well as subsequent DIV elements that can establish the containers themselves. In such an embodiment, a subsequent IFRAME element can specify a second, independently referenceable, source of content to be flowed through another set of containers, which, again, can be established by DIV elements subsequent to that second IFRAME element. Each element establishing a container can have a unique identifier associated with it. Thus, in the above example, the DIV elements comprised identifiers "Alpha", "Bravo" and "Charlie". Continuing with such an example, a second IFRAME element, specifying different content, can be associated with DIV elements comprising identifiers "Delta", "Echo", "Foxtrot" and so on.

Figure 3:
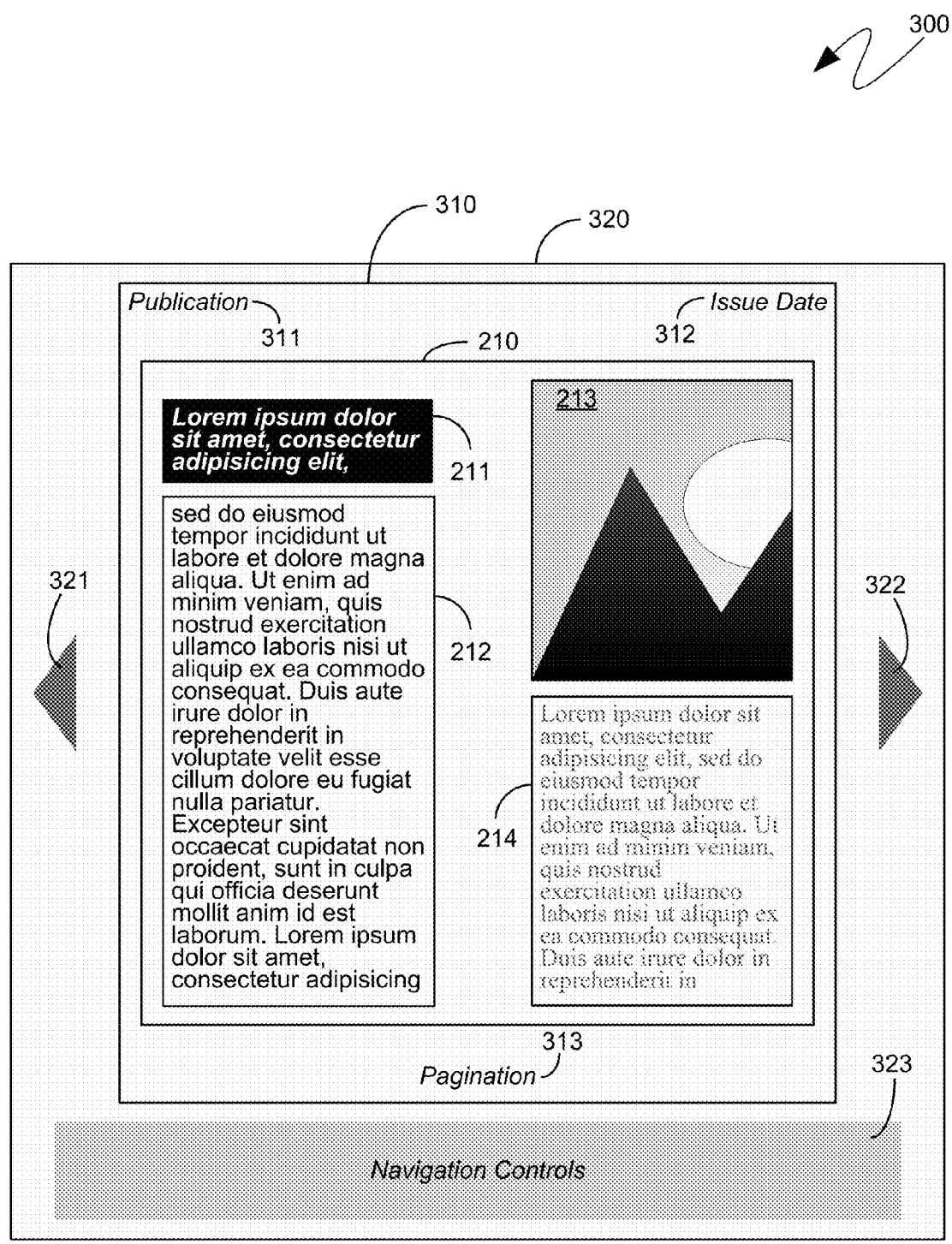
FIG. 3 is a block diagram of an exemplary series of nested containers.

Turning to FIG. 3, the system 300 shown therein illustrates an exemplary utilization of an embodiment in which content containers can be nested one inside another. The previously referenced page display 210, with the previously referenced content containers 211, 212, 213 and 214 is shown in the system 300 of FIG. 3 within the context of a greater user interface. For example, a container 310 can comprise, not only the page display 210, but also additional information, such as information that would be typically found on the peripheries of printed pages. For example, the container 310 can comprise publication information 311, an issue date 312, and pagination information 313. In such an embodiment, the page display 210 can itself be a content container and the content containers 211, 212, 213 and 214 can be nested therein. At one level higher, the content container 210 can be nested inside the content container 310. A display 320 can then comprise this "higher-level" content container 310, as well as other navigational controls 323 and backward arrow 321 and forward arrow 322. In one embodiment, the navigational controls 323 can comprise navigational controls relevant to the content that is being presented. For example, the navigational controls 323 can comprise selections of other "issues", selections of particular pages, and other like navigational controls.

As indicated previously, content can be flowed through content containers. Consequently, the content container 210 can have content, such as in the form of the content containers 211, 212, 213 and 214, flowed through it, and any overflow content can be directed to another content container, similar to the content container 210, except that can be shown as part of the different page, having a different pagination 313. Navigational controls, such as the backward arrow 321 and the forward arrow 322, can be utilized by the user to navigate to such another page, which can comprise a content container that receives the overflow content from the content container 210.

In a similar manner, the content container 310 can have content, such as in the form of the content container 210, flowed through it and any overflow content can be directed to another content container. Consequently, the nesting of content containers can enable content to be broken out into different hierarchies, while retaining rich layout control. For example, the content containers 211, 212, 213 and 214 can represent the content containers through which individual stories, and associated graphics, are flowed. The content container 210 into which lower-level content containers, such as the content containers 211, 212, 213 214, are flowed can represent the content containers through which collections of stories are flowed. For example, the content container 210, as well as further, subsequent, "downstream" content containers can represent a particular section of related stories, such as the "sports" or "business" sections of a newspaper. The content container 310, therefore, as well as further, subsequent, content containers can represent a single publication entity, such as a single magazine or a single newspaper.

Figure 4:
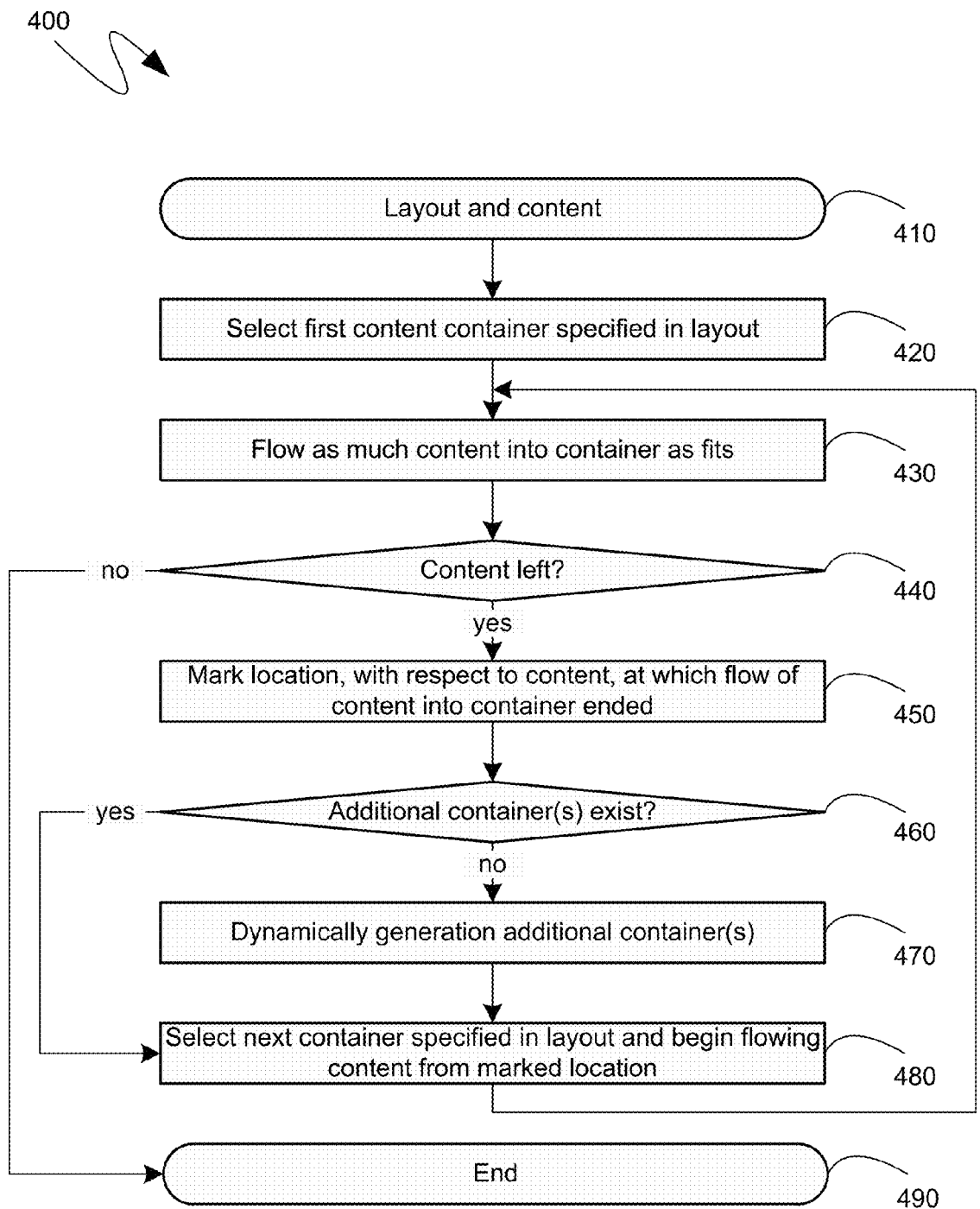
FIG. 4 is a flow diagram of an exemplary flowing of content through containers.

Turning to FIG. 4, the flow diagram 400 shown therein illustrates an exemplary series of steps with which content can be flowed through containers, such as those described in detail above. Initially, as shown by the flow diagram 400, layout and content information can be received at step 410. As indicated previously, such layout and content information can be supplied from independent sources such as, for example, an HTML file that can supply layout information, and textual or graphic files that can provide content information. Subsequently, at step 420, a first content container can be selected and content can be flowed into that container at step 430. As indicated previously, a first content container can be identified with reference to the information specified in an element that establishes such a content container, and possibly with reference to external data sources, such as data sources that can specify the identifiers indicating the order in which content is to be flowed through a set of content containers.

In one embodiment, as part of the flowing of content into a container at step 430, the content that is flowed into the container can be formatted in accordance with formatting specifications relevant to that particular container. Additionally, in another embodiment, a content container can comprise script, or other programmatic constructs, that can act upon, or modify, the content that is flowed into the container. For example, content that is flowed into a container can comprise a survey question, one or more responses, and a graph indicating prior responses. A user can then be allowed to select one or more responses, and the graph can be updated accordingly, such as by scripts or other programmatic constructs that can be associated with the container into which the content was flowed. Such a modification of the graph can be performed despite the fact that the container can be, in essence, only a "window" onto the content.

Once content has been flowed into the container, at step 430, a determination can be made, at step 440, as to whether there is further content left that did not fit into the container at step 430. If, at step 440, it is determined that there remains content, then processing can proceed with step 450, at which point the location, with reference to the content, at which the flow of content into the container at step 430 was stopped, can be marked. Subsequently, at step 460, a determination can be made as to whether one or more additional containers, whose associated flow property identifies the same flow as the container selected at step 420, exist into which further content can be flowed. If, at step 460, it is determined that no such additional containers exist, then, at step 470, at least one such additional container can be dynamically generated to hold the content beyond the location marked at step 450. Processing can then proceed with step 480, where at least one additional container whose associated flow property identifies the same flow as the container selected at step 420, can be selected, and content can be flowed into that container beginning from the location marked at step 450. If, however, at step 460, it was determined that such a container already existed, then processing could have skipped step 470 and proceed directly to step 480. Processing can then, after step 480, return to step 430 and content can be flowed into the newly selected container until, either there is no further content left, or the container is full, at which point processing can proceed in the manner described above. If, however, at step 440, it is determined that there is no further content left, then the relevant processing can end at step 490.

Figure 5:
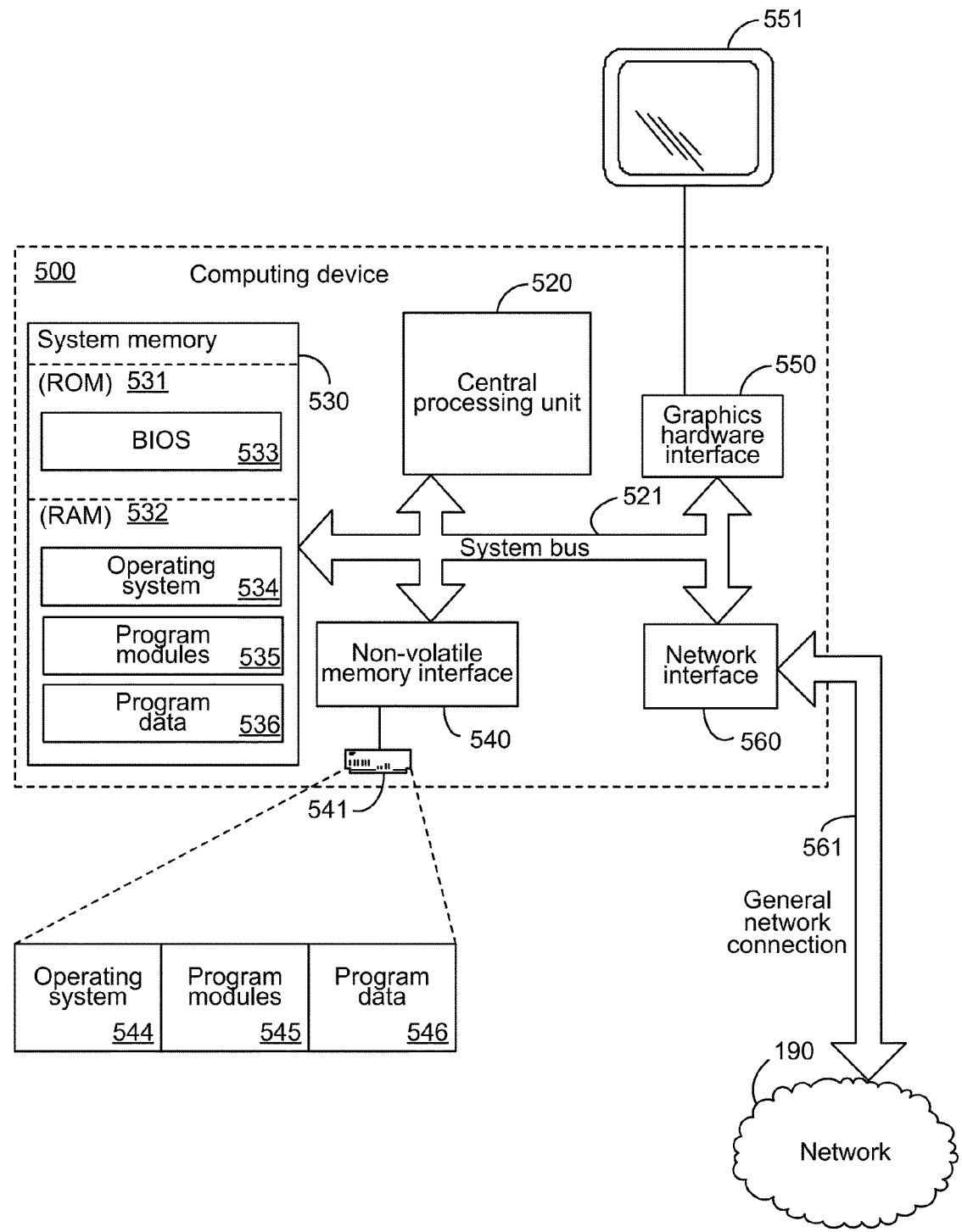
FIG. 5 is a block diagram of an exemplary computing device.

Turning to FIG. 5, an exemplary computing device 500 is illustrated. The exemplary computing device 500 can be any one or more of the computing devices illustrated in FIG. 1, including the computing devices 110 and 120, whose operation was described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of content, as flowed through containers in the above described manner. The graphics hardware can include, but is not limited to, a graphics hardware interface 550 and a display device 551. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536, which can include the above referenced network browser.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to a general network connection 561 through a network interface or adapter 560 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above descriptions, mechanisms for flowing content through defined containers have been presented. In view of the many possible variations of the subject matter described herein, we claim as our invention all such embodiments as may come within the scope of the following claims and equivalents thereto.

We claim:

1. One or more computer-readable storage media comprising computer-executable instructions for flowing content through containers, the computer-executable instructions directed to steps comprising:
  parsing a document comprising:
    a first element having associated with it a first flow property identifying a first flow, the first element establishing a first container;
    a second element having associated with it a second flow property, the second flow property also identifying the first flow, the second element establishing a second container; and
    a third element having associated with it a third flow property identifying a second flow, different and independent from the first flow, the third element establishing a third container;
  obtaining a first content associated with the first flow;
  obtaining a second content associated with second flow;
  flowing the obtained first content into the first container;
  marking, after the flowing the obtained first content into the first container, a location, with respect to the obtained first content, at which the flow of the obtained first content into the first container stopped due to the first container being full, if the first container filled up while additional of the obtained first content remained not flowed into the first container;
  flowing the obtained first content into the second container, commencing with the marked location, if the additional of the obtained first content remained not flowed into the first container;
  flowing the obtained second content into the third container; and
  generating, on a display device communicationally coupled to a computing device executing the computer-executable instructions, the obtained first content in the first and second containers and the obtained second content in the third container, the first and second containers being displayed visually apart from one another with the third container being displayed between the first and second container in accordance with a direction in which content is read by a human user of the computing device.

2. The computer-readable storage media of claim 1, comprising further computer-executable instructions for: applying formatting to the obtained first content flowed into the first container in accordance with a first formatting specification; and applying formatting to the obtained first content flowed into the second container in accordance with a second formatting specification differing from the first formatting specification; wherein the first element further comprises the first formatting specification and the second element further comprises the second formatting specification.

3. The computer-readable storage media of claim 1, comprising further computer-executable instructions for: executing a programmatic construct identified by the first element, the execution of the programmatic construct modifying the obtained first content flowed into the first container.

4. The computer-readable storage media of claim 1, wherein the marked location provides for a dividing of a display of an image between the first and second containers.

5. The computer-readable storage media of claim 1, wherein the document further comprises a fourth element establishing a fourth container; the computer-readable storage media comprising further computer-executable instructions directed to flowing the first and third containers into the fourth container in a nested manner.

6. The computer-readable storage media of claim 1, comprising further computer-executable instructions for dynamically generating a fourth container to receive content that was left over after the second container received the obtained first content commencing with the marked location if the second container filled up while yet additional of the obtained first content remained not flowed into the second container.

7. The computer-readable storage media of claim 1, wherein the obtained first content is an image; and wherein further the generating, on the display device, the obtained first content in the first and second containers comprises generating a portion of the image in the first container and a remaining portion of the image in the second container.

8. The computer-readable storage media of claim 1, wherein the document further comprises an specification of the first content, the specification of the first content being independent of the first element and the second element.

9. A method of flowing content through containers, the method comprising the steps of:
   parsing a document comprising:
      a first element having associated with it a first flow property identifying a first flow, the first element establishing a first container;
      a second element having associated with it a second flow property, the second flow property also identifying the first flow, the second element establishing a second container; and
      a third element having associated with it a third flow property identifying a second flow, different and independent from the first flow, the third element establishing a third container;
   obtaining a first content associated with the first flow;
   flowing the obtained content into the first container;
   marking, after the flowing the obtained first content into the first container, a location, with respect to the obtained first content, at which the flow of the obtained first content into the first container stopped due to the first container being full, if the first container filled up while additional of the obtained first content remained not flowed into the first container;
   flowing the obtained first content into the second container, commencing with the marked location, if the additional of the obtained first content remained not flowed into the first container;
   flowing the obtained second content into the third; and
   generating, on a display device communicationally coupled to a computing device performing the method, the obtained first content in the first and second containers and the obtained second content in the third container, the first and second containers being displayed visually apart from one another with the third container being displayed between the first and second container in accordance with a direction in which content is read by a human user of the computing device.

10. The method of claim 9, further comprising the steps of: applying formatting to the obtained first content flowed into the first container in accordance with a first formatting specification; and applying formatting to the obtained first content flowed into the second container in accordance with a second formatting specification differing from the first formatting specification; wherein the first element further comprises the first formatting specification and the second element further comprises the second formatting specification.

11. The method of claim 9, further comprising the steps of: executing a programmatic construct identified by the first element, the execution of the programmatic construct modifying the obtained first content flowed into the first container.

12. The method of claim 9, wherein the marked location provides for a dividing of a display of an image between the first and second containers.

13. The method of claim 9, wherein the document further comprises a fourth element establishing a fourth container; the method further comprising the steps of: flowing the first and third containers into the fourth container in a nested manner.

14. The method of claim 9, further comprising the steps of dynamically generating a fourth container to receive content that was left over after the second container received the obtained first content commencing with the marked location on if the second container filled up while yet additional of the obtained first content remained not flowed into the second container.

15. The method of claim 9, wherein the obtained first content is an image; and
   wherein further the generating, on the display device, the obtained first content in the first and second containers comprises generating a portion of the image in the first container and a remaining portion of the image in the second container.

16. The method of claim 9, wherein the document further comprises an specification of the first content, the specification of the first content being independent of the first element and the second element.

17. One or more computer-readable storage media comprising computer-executable instructions in the form of HTML IFRAME and DIV elements establishing containers through which content will be flowed, the computer-executable instructions, when parsed, causing the performance of steps comprising:
   obtaining a first content associated with a first flow specified by the HTML elements;
   obtaining a second content associated with a second flow specified by others of the HTML elements;
   flowing the obtained first content into a first container of the containers established by the HTML elements;

marking, after the flowing the obtained first content into the first container, a location, with respect to the obtained first content, at which the flow of the obtained first content into the first container stopped due to the first container being full, if the first container filled up while additional of the obtained first content remained not flowed into the first container;

repeating the flowing and the marking for others of the containers established by the HTML elements so long as additional of the obtained first content remains not flowed into the containers;

flowing the obtained second content into a second container of the containers established by the HTML elements, the second container differing from the first container and from the others of the containers into which obtained first content was flowed; and generating, on a display device communicationally coupled to a computing device on which the computer-executable instructions are parsed, the obtained first content in the first container and the others of the containers into which the obtained first content was flowed and the obtained second content in the second container, the first container being displayed visually apart from the others of the containers into which the obtained first content was flowed with the third container being displayed between the first container and the others of the containers into which the obtained first content was flowed accordance with a direction in which content is read by a human user of the computing device.

18. The computer-readable storage media of claim 17, wherein the content flowed through at least one of the containers comprises at least one other of the containers.

19. The computer-readable storage media of claim 17, comprising further computer-executable instructions for specifying a formatting to be applied to the content flowed through a container, the specifying the formatting being independent of any specifying of formatting of any other container.

20. The computer-readable storage media of claim 17, comprising further computer-executable instructions for specifying a programmatic construct whose execution will modify the content flowed into a container associated with the specifying the programmatic construct.

* * * * *